(12) United States Patent
Sahakian et al.

(10) Patent No.: US 11,851,122 B2
(45) Date of Patent: Dec. 26, 2023

(54) ROBOT FOR TIGHTENING A SERIES OF BOLT NUTS ON A VEHICLE CHASSIS AND MANUFACTURING PROCESS

(71) Applicant: Volvo Truck Corporation, Gothenburg (SE)

(72) Inventors: Charles Sahakian, Décines (FR); Johan Iderot, Gothenburg (SE); José Vieira, Montreuil sous Bois (FR); Ekhi Laniesse, Pontoise (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/573,718

(22) Filed: Jan. 12, 2022

(65) Prior Publication Data

US 2022/0227438 A1      Jul. 21, 2022

(30) Foreign Application Priority Data

Jan. 19, 2021   (EP) .................................... 21305060

(51) Int. Cl.
  *B62D 65/00*     (2006.01)
  *B25J 11/00*     (2006.01)
  *B62D 27/06*     (2006.01)

(52) U.S. Cl.
  CPC ............. *B62D 65/00* (2013.01); *B25J 11/005* (2013.01); *B62D 27/06* (2013.01)

(58) Field of Classification Search
  CPC ........ B62D 65/00; B62D 27/06; B25J 11/005; B23P 19/006; B23P 19/06; B23P 19/10; B23P 19/04; B25B 23/005; B25B 13/5091; F01L 1/20; B23Q 17/0966; B21J 15/32
  See application file for complete search history.

(56) References Cited

U.S. PATENT DOCUMENTS

| | | | | |
|---|---|---|---|---|
| 5,131,698 | A * | 7/1992 | Calmettes | F01N 13/1805 24/19 |
| 9,987,714 | B2 * | 6/2018 | Henderson | B21J 15/32 |
| 10,046,377 | B2 * | 8/2018 | Batt | B21J 15/32 |
| 11,407,088 | B2 * | 8/2022 | Gimondo | B25B 13/5091 |
| 2006/0048364 | A1 * | 3/2006 | Zhang | B23Q 17/0966 29/709 |
| 2008/0155807 | A1 * | 7/2008 | Toh | B23P 19/04 29/700 |
| 2009/0107296 | A1 * | 4/2009 | Tachino | F01L 1/20 81/9.24 |
| 2016/0243685 | A1 * | 8/2016 | Blake | B25B 13/065 |

(Continued)

FOREIGN PATENT DOCUMENTS

| | | |
|---|---|---|
| EP | 3251798 A1 | 12/2017 |
| JP | 2000110816 A | 4/2000 |

(Continued)

*Primary Examiner* — Lee A Holly
(74) *Attorney, Agent, or Firm* — Withrow & Terranova, PLLC

(57) ABSTRACT

The invention relates to a robot for tightening bolt nuts on a vehicle chassis, the robot comprising a polyarticulated arm at the end of which is a nut tightening tool. A sleeve-shaped centering member is fixed around the nut tightening tool and comprises a frustoconical surface which makes it possible, on contact with a nut, to reposition the nut tightening tool automatically in the axis of the nut.

7 Claims, 8 Drawing Sheets

(56) References Cited

U.S. PATENT DOCUMENTS

2018/0333811 A1    11/2018  Maeda
2021/0039264 A1*    2/2021  Ishizuka .............. B25J 15/0019
2022/0205890 A1*    6/2022  Chen ........................ G01D 7/00

FOREIGN PATENT DOCUMENTS

WO         2016169844 A1    10/2016
WO     WO-2016169844 A1 *  10/2016

* cited by examiner

PRIOR ART

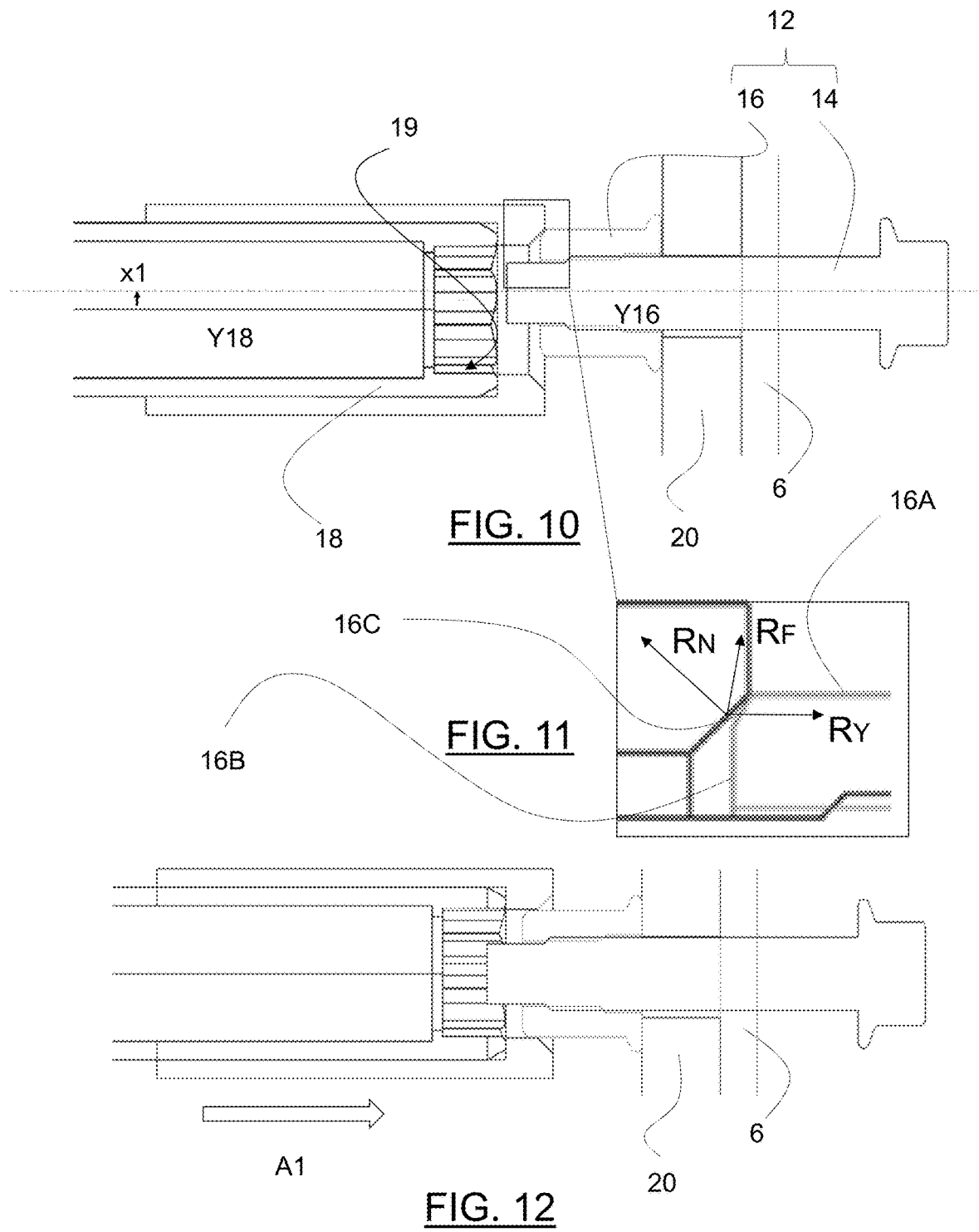

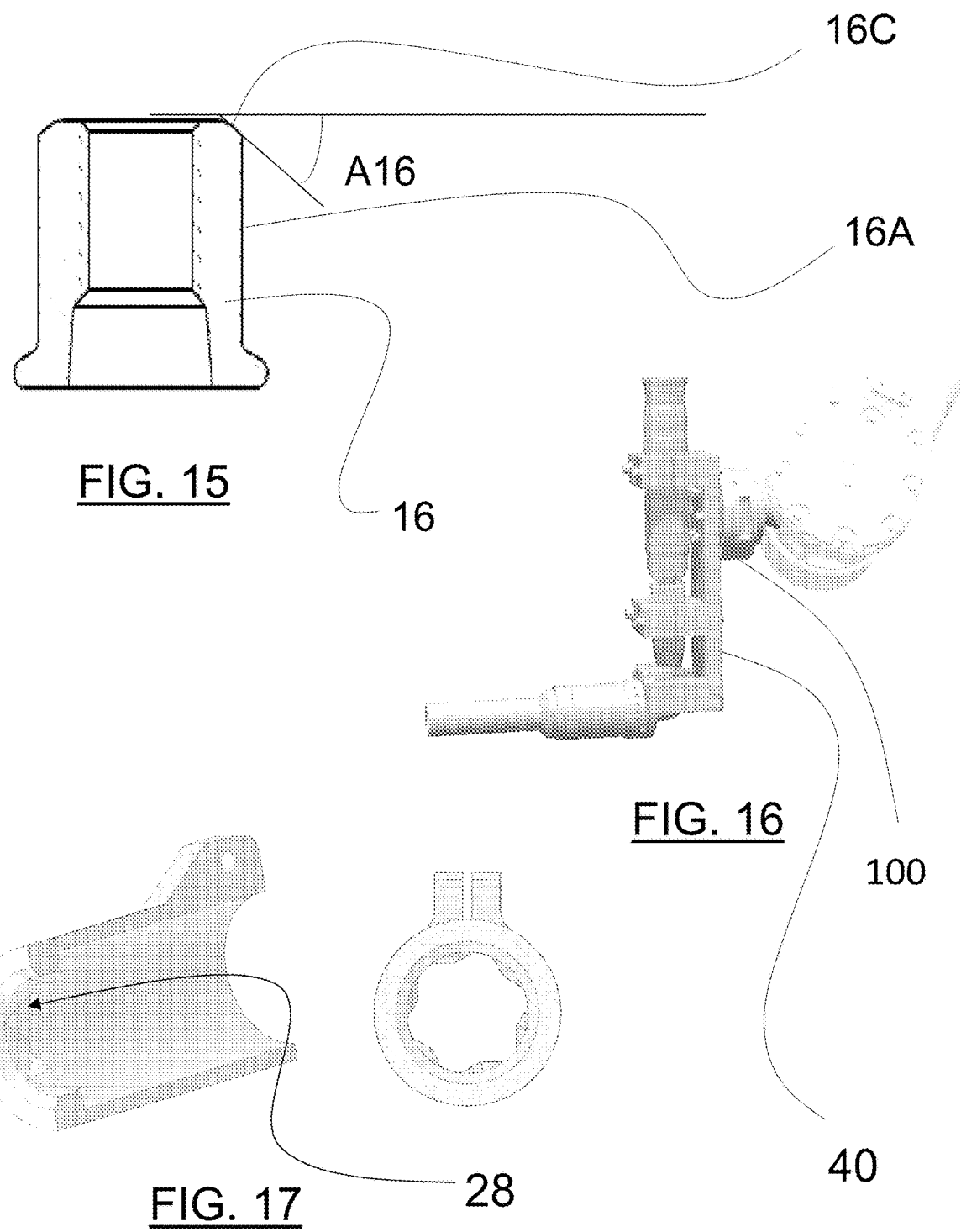

ROBOT FOR TIGHTENING A SERIES OF BOLT NUTS ON A VEHICLE CHASSIS AND MANUFACTURING PROCESS

RELATED APPLICATIONS

The present application claims priority to European Patent Application No. 21305060.2, filed on Jan. 19, 2021, and entitled "ROBOT FOR TIGHTENING A SERIES OF BOLT NUTS ON A VEHICLE CHASSIS AND MANUFACTURING PROCESS," which is incorporated herein by reference in its entirety.

TECHNICAL FIELD

The invention relates to a robot for tightening a series of bolt nuts on a vehicle chassis and to a manufacturing process of a vehicle using such robot.

The invention can be applied in the manufacturing process of heavy-duty vehicles, such as trucks, buses and construction equipment. Although the invention will be described with respect to the manufacturing process of a truck, the invention is not restricted to this particular vehicle, but may also be used in other vehicles such as passenger cars, airplanes, military vehicles and so on.

BACKGROUND

In known manner, bolts are widely used in the manufacturing processes of vehicles to attach brackets or the like to the vehicle chassis. In the example of a truck, the chassis is constituted of two longitudinal beams, provided with a plurality of holes for receiving the bolts.

Today, operators are needed to manually tighten the bolts nuts. In the future, this operation could be done by a robot. However, it is known that a reaction torque can be observed at the end of the tightening process. Indeed, the assembly is mechanically stressed during the tightening operation, and is subject to elastic deformation. At the end of the tightening operation, the components of the assembly tend to return to their initial shape, which creates a reaction torque. Therefore, in order to automatize this operation, the robot must be designed so that its wrist (terminal axis) is capable of withstanding the reaction torque over a long period of time (reliability, durability). Today, M14 Hexagonal Bolts represent 80% of the fasteners that are used on the chassis trucks. For the record, this kind of bolts requires a tightening torque that is about 175 N·m. Accordingly, the reaction torque value must not exceed the maximum value tolerated by the robot terminal axis.

Another challenge with regard to the automation of the bolt nut tightening process is to be able to tighten a series of bolts in succession by means of the robot. Indeed, a series of tests showed that the repetitive tightening on a chassis with a succession of bolts is a problem. Today, only three bolts can be tightened successively, not more.

The problem is mainly linked by the dispersion between the axis of the holes, which is about +/−0.4 mm, while the trajectory precision of the robot is about +/−0.2 mm. Accordingly, there are some situations in which the nut tightening tool axis is not perfectly aligned with the axis of the bolt. In such situation, the tightening tool cannot achieve the tightening process.

An objective would be to be able to tighten 15 bolts in a row without failure and stop. To do that, an obvious solution would be to equip the robot with a vision system that would enable to precisely locate the bolts nuts to be tighten and realign the tightening tool when necessary. However, this solution is very costly and the corresponding software would be hard to implement. This also raises the question of the reliability of the system.

In the Patents Literature, US 2018 0 333 811 A1 discloses a screw guide device that guides a screw to a screw hole, the screw being fastened by a screw fastening device to the screw hole formed in a work piece to be fastened. The screw guide device comprises a guide device body provided at a support that supports the work piece to be fastened and a guide member that is provided in the guide device body and that is openable and closable in a radial direction orthogonal to a central axis of a shaft section of the screw. The guide member forms a screw insert through which the shaft section is inserted when the guide member is in a closed state.

EP 3 251 798 A1 discloses a powered nut runner comprising a socket which is rotatably arranged in the powered nut runner and which is configured to accommodate a nut, a motor configured to exert a torque on the socket for powered fastening of a nut accommodated in the socket to a bolt, nut reservoir connecting means for connecting the powered nut runner to a nut reservoir, and a feed channel extending from the socket. The powered nut runner is configured to enable a nut stored in the nut reservoir to become automatically transported from the nut reservoir into the socket via the feed channel, when the powered nut runner is connected to the nut reservoir.

SUMMARY

An object of the invention is to provide a robot capable of tightening a series of at least fifteen bolt nuts on a vehicle chassis, without failure or stop. Another object of the invention is to ensure the durability and reliability of the robot.

Today, the nut tightening operations that are made by a robot are not very frequent in the vehicles manufacturing industry. It mainly exists mainly for low tightening torques, e.g. inferior to 45 N·m. Concerning medium tightening torque, e.g. 100 N·m, it exists some solutions that are used to assemble the engine. However, there is today no solution involving robots for bolts that need high tightening torque, such as 175 N·m, to tighten bolt nuts on the chassis.

The object is achieved by a robot.

By the provision of a sleeve-shaped centering member that is fixed around the tightening tool, it is possible, on contact with a nut, to reposition the nut tightening tool automatically in the axis of the nut. Consequently, if in the approach phase, the nut tightening tool is not perfectly in the axis of the bolt (because of the dispersion), then the centering member abuts against the nut. Thanks to the chamfer present at the end of the centering member, the continuation of the approach movement causes, by "wedge effect", an offset movement of the tightening tool towards the axis of the bolt. This causes the tightening tool to realign with the central axis of the nut. The tightening process can then be achieved.

Advantageous, but not compulsory aspects of the invention are depicted in the dependent claims.

The invention also concerns a process which relates to a manufacturing process of a vehicle, using a robot as defined in the claims to tighten a succession of bolt nuts on a vehicle chassis.

BRIEF DESCRIPTION OF THE DRAWINGS

With reference to the appended drawings, below follows a more detailed description of embodiments of the invention cited as examples.

In the drawings:

FIG. 10 represents a first step of the bolt nut tightening process, corresponding to the approach phase between a bolt nut and the nut tightening tool, and in which it can be seen that the nut tightening tool is not coaxially aligned with the central axis of the nut;

FIG. 11 is an enlarged view of FIG. 10;

FIG. 12 is a view similar to that of FIG. 10, representing a second step, in which it can be seen that the nut tightening tool has been automatically realigned coaxially with the nut;

FIG. 15 is a section view of a nut;

FIG. 16 is a perspective view of an alternative embodiment of the invention in which a force sensor is arranged at the junction between robot arm and tightening tool; and FIG. 17 shows another embodiment for the centering member, having a slightly different geometry.

DETAILED DESCRIPTION OF EXAMPLE EMBODIMENTS OF THE INVENTION

Figure 1:
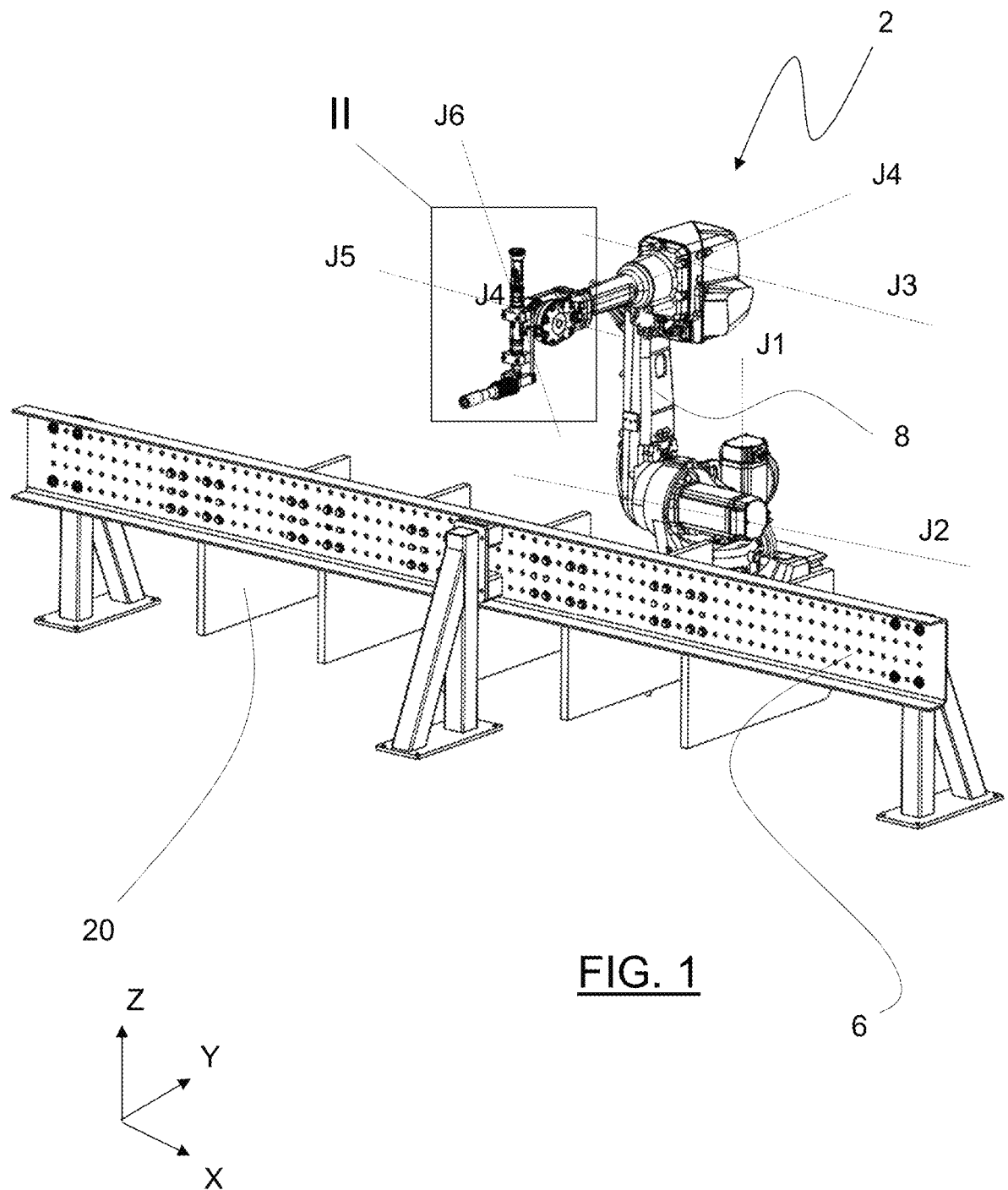
FIG. 1 represents a perspective view of a test stand, comprising a truck chassis beam resting on supports and a robot of the invention equipped with a tool for tightening the nuts of the bolts received in holes of the beam.

FIG. 1 shows a robot 2 for tightening bolt nuts 16 on a vehicle chassis 6. The robot 2 comprises a poly-articulated arm 8 provided with an End Of Arm Tooling (EOAT) 10 that is a nut tightening tool.

In the example, a support 40 is provided to attach the nut tightening tool 10 to the robot arm 8. Accordingly, the support 40 makes the interface between the robot arm 8 and the nut tightening tool 10.

Basically, the robot 2 itself (without the EOAT 10) is known as such (It can be purchased on the market, for example to the company ABB). Similarly, the nut tightening tool 10 itself is also known per se.

The vehicle chassis 6 includes in practice two longitudinal steel frames (also known as truck's side beams), among which one only is represented on the figures. Each beam 6 includes a plurality of holes inside which are received bolts 12. Each bolt 12 includes a threaded rod 14 and a nut 16. Rod 14 includes a screw head 140 and a non-threaded portion 142 arranged at one (longitudinal) end opposite to the screw head 140. The threaded portion of rod 14 extends longitudinally between the head 140 and the end portion 142. The non-threaded portion 142 has a non-circular section, for example a square section.

The nut 16 includes a hexagonal section. More precisely, the section of the nut 16 is a regular hexagon that is both equilateral and equiangular. It is also bicentric, meaning that it is both cyclic (has a circumscribed circle) and tangential (has an inscribed circle).

As shown on FIGS. 10 and 11, each nut 16 includes a radial outer face 16A of hexagonal section, an axial end face 16B and a chamfer 16C connecting the end face 16B to the radial hexagonal face 16A.

In the example, bolts 12 are "M14" hexagon head bolts, 14 being the diameter (in millimeters) of the threaded section. Also, the torque to be applied for tightening such bolt nuts is about 175 N·m. Also, bolts 12 are used to fasten a plurality of brackets 20 on the chassis 6. These brackets 20 can serve as a support for battery packs, in particular for Hybrid Electric Vehicles (HEV's) or Full Electric Vehicles (EV's). However, in variant, these brackets 20 can obviously be used for another purpose, such as supporting the fuel tank, the EATS or the like.

In the example of the figures, a plurality of bolts, typically eleven bolts are used to fasten one bracket 20. Obviously, each bracket 20 includes a plurality of holes for the passage of the bolt screws 14.

In the embodiment of the figures, the arm 8 includes 6 axes of rotation J1 to J6, which means that it is a 6-axis robot. Six axes allow the robot to move in the X, Y and Z planes (Cf. FIG. 1), as well as position itself using roll, pitch, and yaw movements.

In reference to FIG. 1, the beams of the chassis extend along the X direction, while the bolts 12 extend along the Y direction.

Also, robot 2 is preferably a "small robot", meaning that the robot payload is between 10 kg and 20 kg, while the robot reach is between 1.2 m and 1.65 m. As a reminder, the robot payload is the weight the robot can lift. Payload includes the weight of the EOAT and the weight of the product being picked, if appropriate. The robot reach is the distance from the center of the robot to the fullest extension of the robotic arm. This measurement determines the robot's work envelope.

In the example, the robot 2 is capable of following a path with an accuracy of +1-0.2 mm (relative to a control path). In this respect, and as known per se, the robot 2 further includes a robot arm trajectory control unit (Not shown) for repeating a nut tightening operation on a series of bolts.

Basically, there is an integrated software that enables to program the trajectory of the robot, depending on the location of the bolt nuts to be tighten. This integrated software uses the coordinates X, Y, Z of the nuts to be tighten as input data. The software may include different computer programs for different pre-established bolt configurations.

In the example of the manufacturing process of a truck, the longitudinal beams that constitute the chassis of the truck (or frame) delimit a succession of holes at standard locations. Also, on the same model of truck, bolts are at the same locations, which means that the coordinates of the bolt nuts to be tighten can be recorded in advance and that there is no need to reprogram the robot at each new truck.

Robots and associated software have largely been used in the industry during the last decades, which means that writing a computer program for automatically moving the EOAT at different locations to achieve a specific task, e.g. nut tightening, is now part of general knowledge, that is why the software integrated into the robot 2 of the invention is not further described.

Advantageously, the nut tightening tool 10 is of the electric type, which means that it is electrically driven. However, it could obviously be pneumatically driven in alternative.

Preferably, the nut tightening tool is of the low reaction torque type, which means that the reaction force that is transmitted to the robot at the end of the tightening process is null or almost null (while the tightening torque is about 175 N·m). In practice, such "low reaction tool" enables to have not more than 0.5 N·m that is transmitted to the robot arm. For the record, the maximum torque that is supported by the robot terminal axis (J6) is between 6.4 N·m and 16.7 N·m, depending on the size of the robot (1.2 or 1.65 m).

In the example, the torque range of the nut tightening tool 10 is comprised between 140 N·m and 190 N·m.

The tightening tool 10 consists of an inside socket 17 comprising a gripping portion for driving the end portion 142 of the bolt screw 14 in a first direction (e.g. counter-clockwise), until the screw head 140 abuts against the frame 6 and an outside socket 18 for driving the nut 16 in a second direction (e.g. clockwise) opposite to the first direction when the screw head 140 is in contact with the frame 6. Advantageously, the gripping portion of the inside socket 17 has a shape complementary to that of the end portion 142 of the screw 14 (e.g. square-shaped), so as to allow a male/female engagement (the male part being the screw end portion 142, the female part being the inside socket 17) and as to transmit the rotating movement of the inside socket 17 to the screw 14.

The nut tightening tool 10 is known as such, that is why it is not further described herein (See JP2000110816A for further details).

The "low reaction torque" effect is achieved thanks to a gearbox system (not shown) arranged between the E-motor and the outside socket 18 (See WO 2016/169844A for more precisions).

The outside socket 18 includes one end orifice 19 whose shape is complementary to that of the nuts 16, which means that it is hexagonal as well, in order to drive the nut 16 in rotation by male/female complementarity (the male part being the nut, while the outside socket is the female part).

Figure 2:
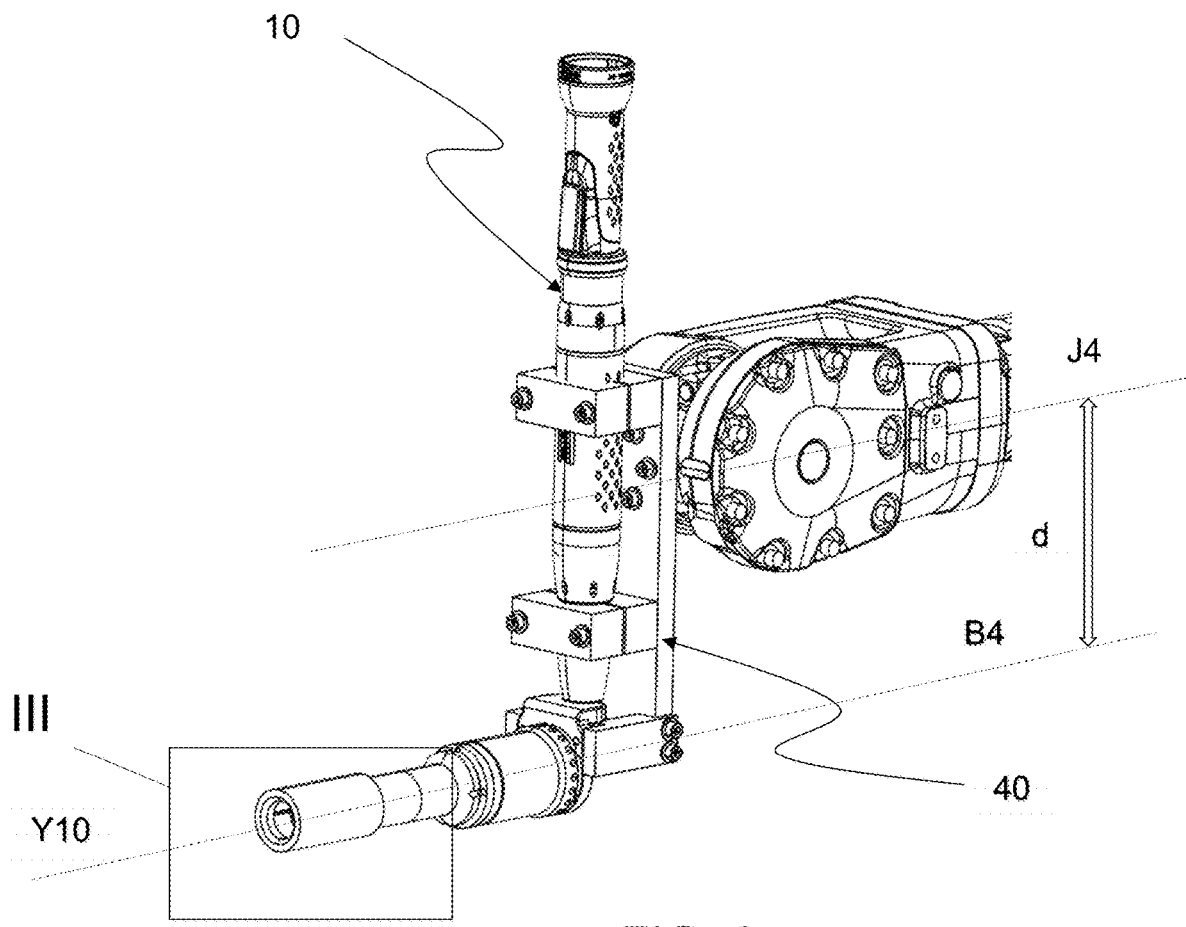
FIG. 2 is an enlarged view according to the rectangle II drawn on FIG. 1.

Advantageously, and as shown on FIG. 2, the inventors are of the opinion that the distance d between the axis Y10 of the outside socket 18 and the axis J4 should be as small as possible in order to avoid the deformation of the support 40 during the engagement phase.

A sleeve-shaped centering member 22 (also known as the "cone"), typically in steel CK45, is arranged around the nut tightening tool 10. The centering member 22 defines a central axis Y22. Possibly, any other material could be used for manufacturing the centering member 22, such as Copper or an alloy. This can further help in reducing the number of nuts that are damaged/marked during the tightening process.

This centering member 22 comprises a frustoconical surface 24, which makes it possible, on contact with a nut 16, to reposition the nut tightening tool 10 automatically in the axis Y16 of the nut 16.

Advantageously, the angle A24 of the surface 24 relative to the axis of the centering member 22 is comprised between 30° and 60°, preferably equals to 30° or 45°. Inventors think that an angle of 30° could be of particular relevance.

Figure 7:
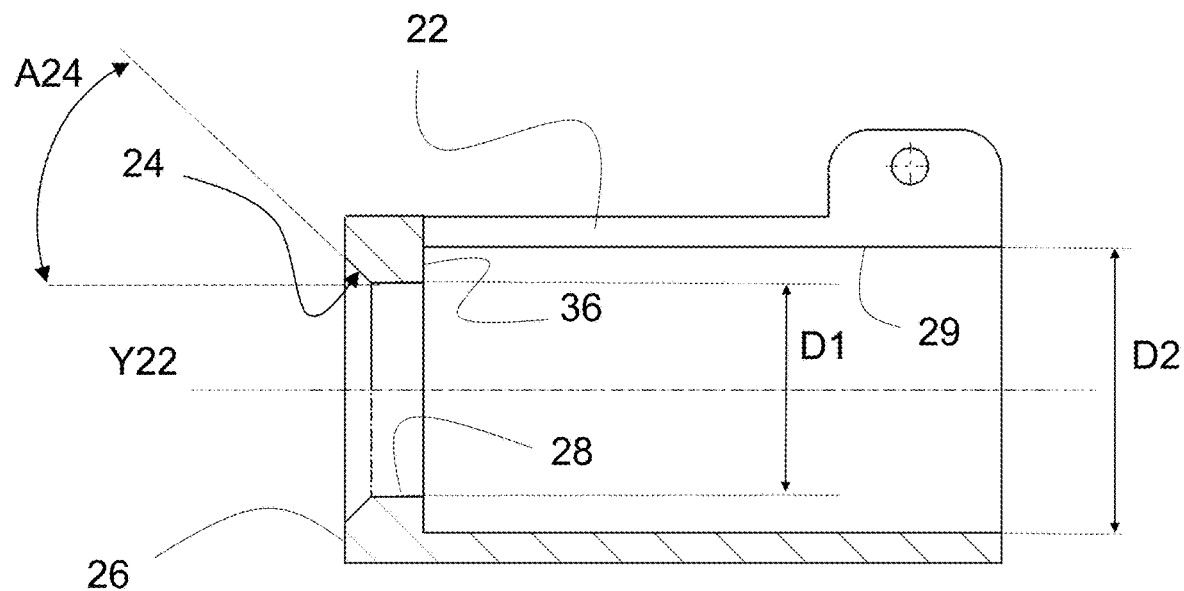
FIG. 7 is a cut view according to plane VII of FIG. 6.

Basically, and as shown on FIG. 7, the frustoconical surface 24 is a chamfer extending between one end surface 26 of the centering member perpendicular to a central axis Y22 of the centering member 22 and an inner radial surface 28 parallel to the central axis Y22 of the centering member 22.

In one embodiment, the inner radial surface 28 is smooth (i.e. of circular section). In one alternative embodiment represented on FIG. 17, the section of the inner surface 28 could be different, e.g. to match with the section of the nut 16. Accordingly, in this alternative embodiment, the inner surface 28 includes some recesses, typically, six recesses, to fit the nut edges. Inventors are of the opinion that this may help to improve the engagement of the centering member 22 around the nut 16.

Figure 3:
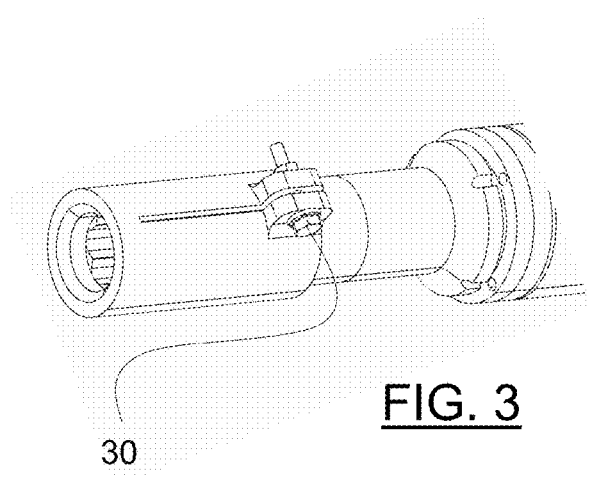
FIG. 3 is a detailed view of the rectangle III drawn on FIG. 2.
Figure 4:
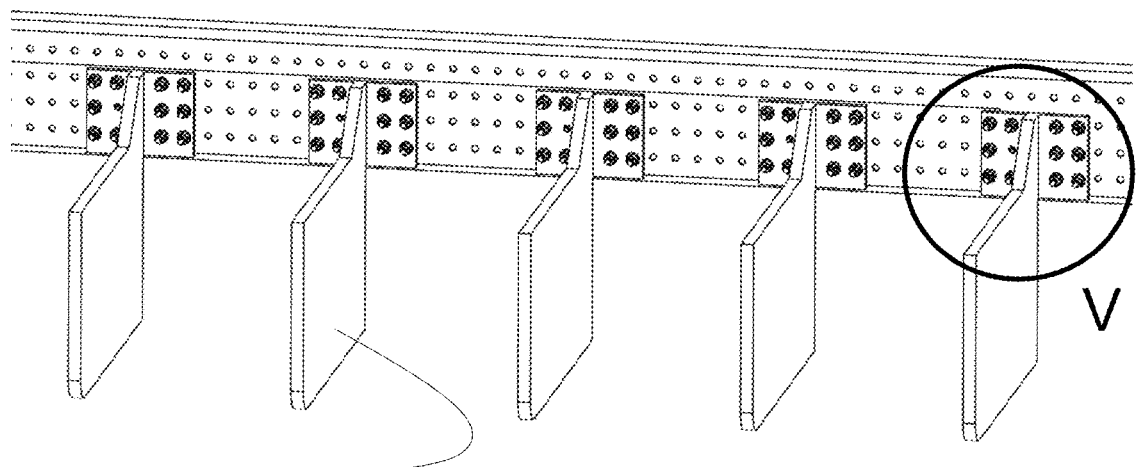
FIG. 4 is a detailed view of a truck's chassis, representing the nuts of the bolts allowing to fasten a plurality of brackets.
Figure 5:
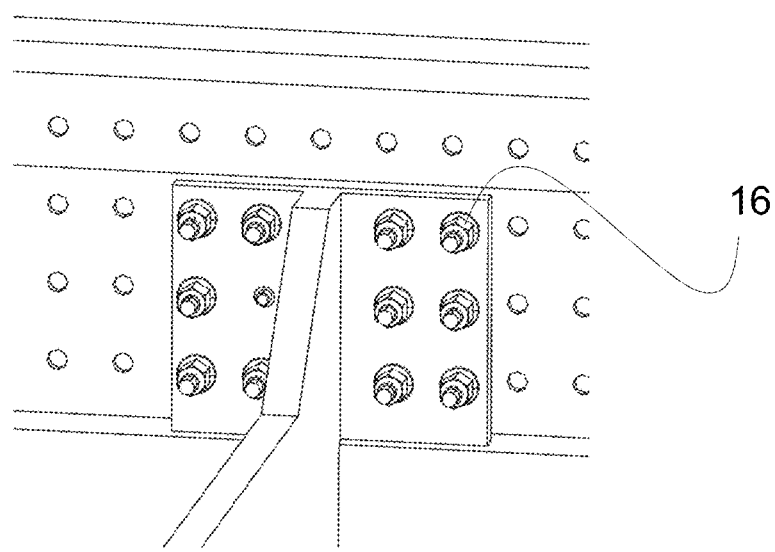
FIG. 5 is an enlarged view of the circle V drawn on FIG. 4.
Figure 6:
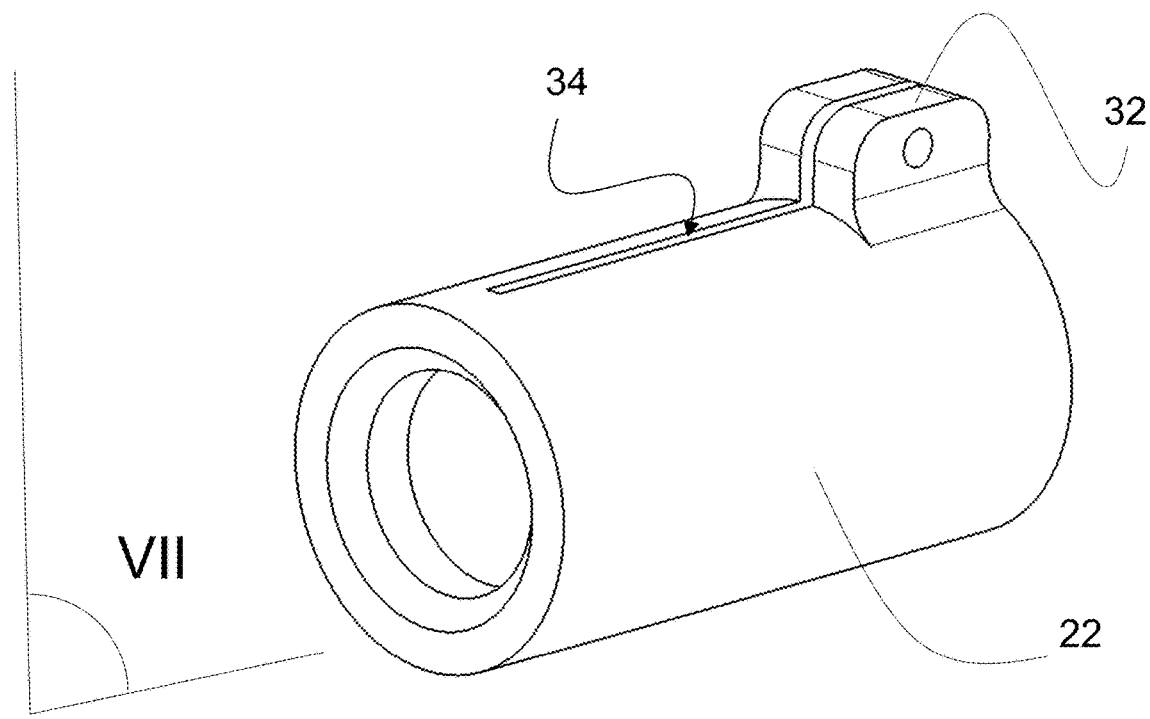
FIG. 6 is a perspective view of the sleeve-shaped centering member.

Preferably, and as shown on FIG. 3, a clamping bolt 30 is provided for clamping the centering member around the nut tightening tool, said clamping screw 30 passing through two tabs 32 (Cf. FIGS. 6 and 7) facing each other and separated one from the other by an axial slot 34. In this respect, tabs 32 each include a through hole for receiving the threaded section of bolt 30. Obviously, in a variant not shown, any other means could be used to fasten the centering member 22 around the tightening tool 10.

In the example, the centering member 22 further includes an internal radial shoulder 36, which connects the inner radial surface 28 with another inner radial surface 2a This means that there are two different diameters D1 and D2 on the inside of the centering member 22. D1 is the diameter of the radial surface 28 and D2 is the diameter of the radial surface 29. The diameter D2 is strictly greater than the diameter D1.

Advantageously, the diameter D2 is roughly equal to the outer diameter of the outside socket 18 and the diameter D1 is roughly equal to that of the circumscribed circle of the hexagonal section of the nut 16. Obviously, a clearance exists between centering member 22 and socket 18 to allow mounting the centering member 22 around the outside socket 18. Also, there is also a clearance between the nut and the outside socket 18 to allow positioning the socket 18 around the nut 16.

Advantageously, the centering member 22 projects axially beyond the nut tightening tool 10. Basically, in the example of the figures, the axial end of the outside socket 18 abuts against the radial shoulder 36 of the centering member 22.

Figure 8:
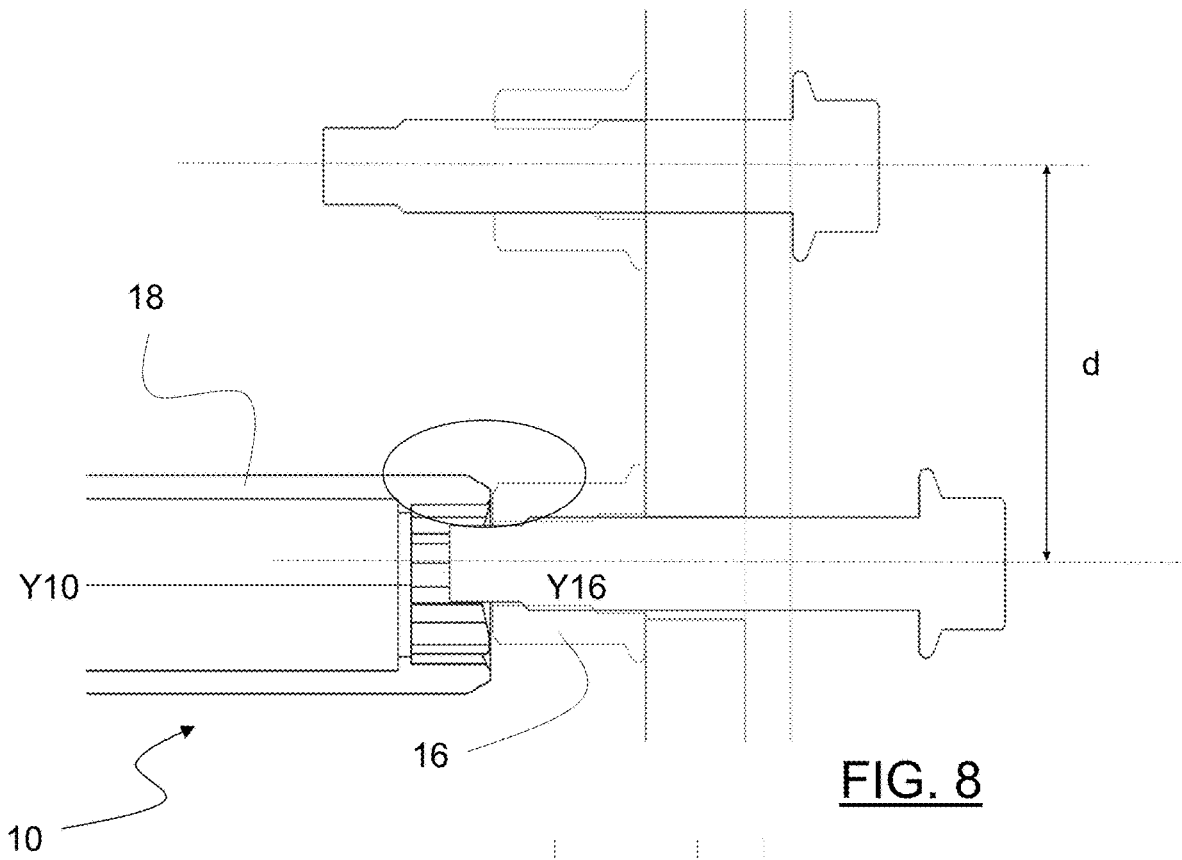
FIGS. 8 and 9 represent possible failure situations that could happen with robots of prior art.
Figure 9:
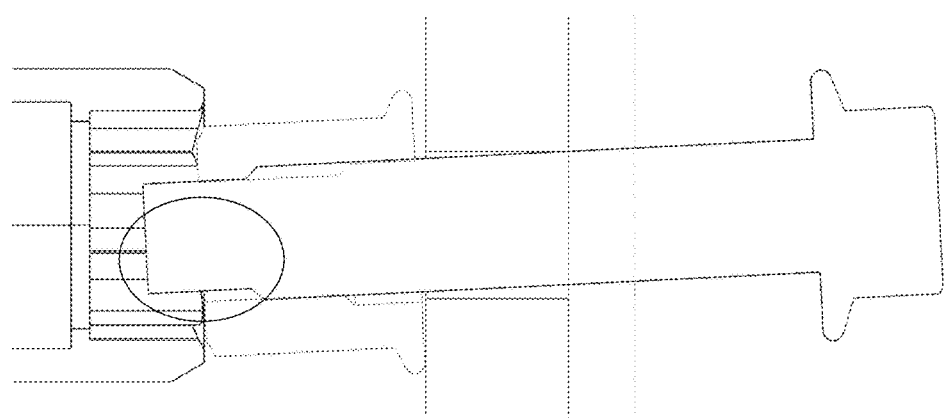

It is now referred to FIG. 8 that shows a problem that may be encountered with prior art robots. More specifically, FIG. 8 shows that two bolts that are spaced one from the other by a distance d. Manufacturing tolerances for such distance are +/−0.4 mm, while the precision of the robot are not less than +/−0.2 mm. Therefore, there are some situations, such as the one of FIG. 8, in which the nut tightening tool axis Y10 is not perfectly aligned with the axis Y16 of the bolt 16. In such situation, the outside socket 18 of tool 10 cannot be engaged around the nut 16 and the nut tightening tool 10 cannot achieve the tightening process. FIG. 9 shows that the same problem is encountered when the bolt 12 is engaged crosswise inside the hole delimited in the beam 6.

Referring now to FIGS. 10 and 11, it can be seen that such problems can be overcome using the centering member 22 of the invention. Indeed, and as shown on FIG. 10, when the central axis Y18 of the outside socket 18 does not match with the central axis Y16 of the nut 16, the frustoconical surface 24 of the centering member 22 axially abuts against the nut 16. Thanks to the inclined nature of the contact surface 24 present at the end of the centering member 22, the continuation of the approach movement along Y causes, by "wedge effect", an offset movement xl of the tightening tool 10 towards the axis of the nut 16.

As a matter of facts, and as shown on FIG. 11, when the centering member 22 abuts against the nut 16, the nut 16 exerts on the frustoconical surface 24 a reaction effort RN which is substantially perpendicular to the surface 24. This reaction effort RN, combined with the axial effort RY exerted by the EOAT 10, generates a resulting effort RF that is oriented so as to push the centering member 22, and therefore the EOAT 10, radially away from the central axis Y16 of the nut 16. This causes the outside socket 18 to reach the configuration of FIG. 12 in which it is coaxially aligned with the nut 16.

The inventors are of the opinion that the more the angle A24 of the chamfer 24 is wide, the more is the reaction force RF. In order to avoid the damage of the nut during this phase, a smaller angle (30°) would be probably better.

Also, and as represented on FIG. 15, the inventors have thought of increasing the angle A16 of the nut chamfer 16C from 15-30° to 60° in order to further decrease the damage observed of the nut 16 during the engagement phase (Cf. FIG. 15).

In parallel, a software is used by the robot to follow the centering member 22 in the displacement during this phase without forcing. This software, which is known as "Soft-Move" (Property of company ABB), allows the robot to be compliant or floating in order to adjust to external forces or variations in work objects. With "SoftMove", the robot is compliant, which facilitates accuracy and reliability. The "SoftMove" enables to lower the stiffness of the robot in a specified Cartesian direction while mainly maintaining the original behavior in other directions: Robot can be "free floating" in a specified direction and can have a spring function in a specified direction. Stiffness and damping parameters can be used to control the compliance. This software also enables gravity compensation: The stiffness can be lowered in a vertical direction.

The basic SoftMove program, which does not consider the addition of the centering member 22, includes the following steps:
1. Robot: Approach movement→the socket is at the edge of the screw dog point expected position
2. Robot: Activation of the tightening tool continuous rotation (speed 20 rpm, no torque control)
3. Robot: Activation of the "SoftMove" computer program (60% Stiffness Z axis, 15% stiffness XY axis)
4. Robot: Linear movement to the final engage position (linear speed 10 mm/s)
5. Robot: Wait robot reach 0 speed and check the reached position. Nut is now in contact of the bracket.
6. Robot: IF reached position is ok (socket totally engaged in the nut)
    →Activation of the tightening program (300 rpm rundown and 175 Nm tightening torque)
    ELSE IF reached position is not ok (socket not engaged in the nut)
    →Move back linear movement of 15 mm→restart at Step 4.
7. Robot: Wait tightening done
8. Robot: Move back linear movement (50 mm)
9. Robot: Move to next bolt.

In order to avoid as much as possible damaging the nuts 16, and to have a better precision of the engagement force between the centering member 22 and the nut 16 than that of the SoftMove system, a force control sensor 100 could be added between the robot and the tool support 10 (Cf. FIG. 16).

For the phase of the tool engagement, in which the centering member 22 contacts with the nut 16, some parameters have been set on the electric tightening tool power focus. Two phases are needed for the tightening strategy program. One phase for the tool engagement on the nut and a second phase for the tightening operations. The parameters selected are set for the speed, torque, time and angle.

Advantageously, no camera is needed. In other words, the robot 2 is devoid of camera.

Figure 13:
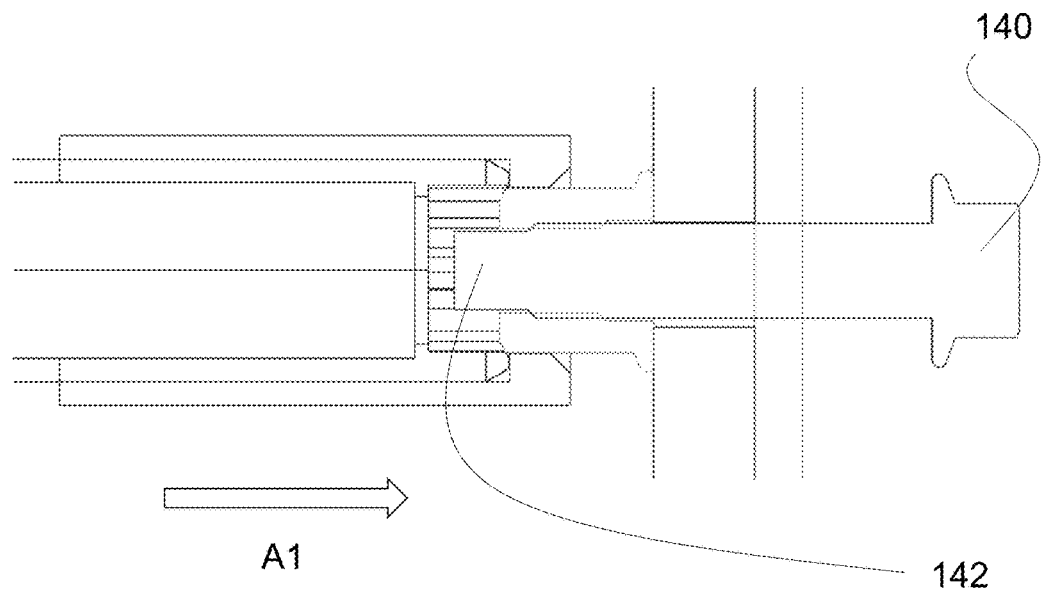
FIGS. 13 and 14 are views similar to FIGS. 10 and 12, representing the movement of the nut tightening tool until it reaches the end configuration in which the nut can be tightened.
Figure 14:
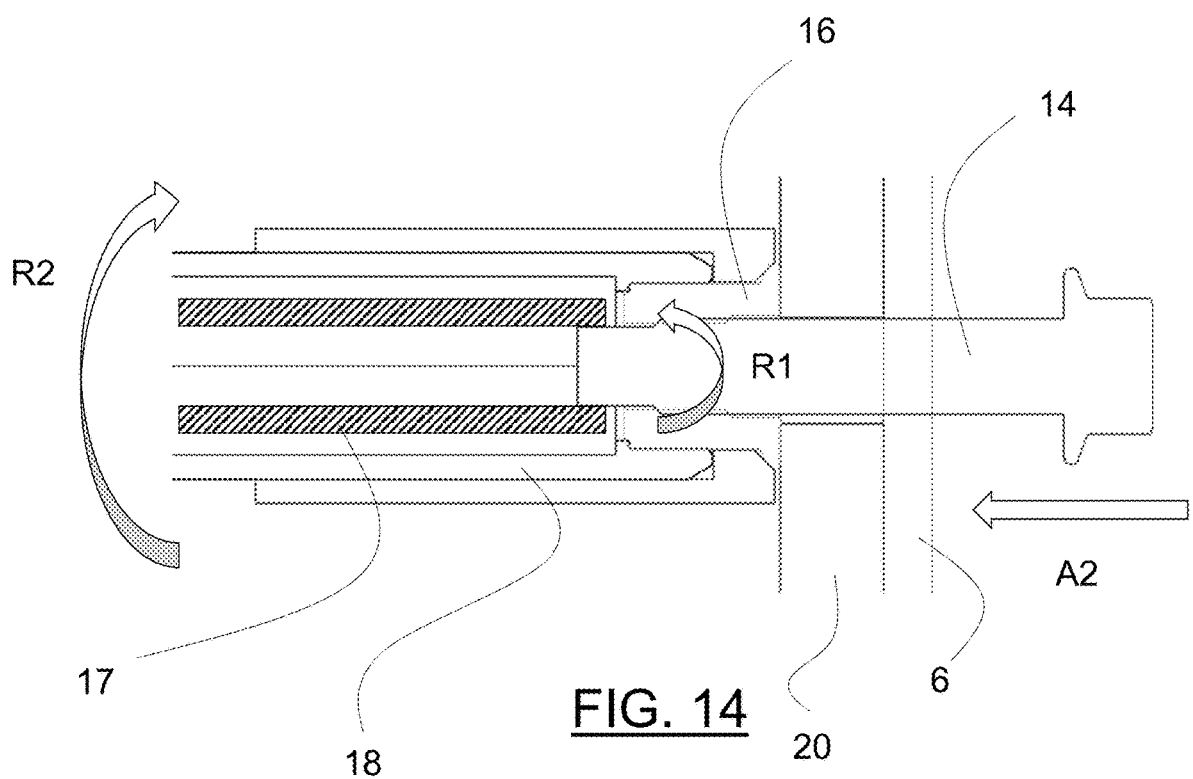

The outside socket 18 can then be moved in direction of nut 16 to reach successively the configurations of FIGS. 13 and 14. Arrows A1 on FIGS. 13 and 14 represent the direction of movement of the sleeve 18.

Once configuration of FIG. 14 has been reached, the tightening process per se can be achieved. In details, the gripping portion of inside socket 17, i.e. the extremity of inside socket 17, engages around the end portion 142 of screw 14. Then, the inside socket is driven in rotation (See arrow R1), leading the screw 14 to rotate and move longitudinally to the left in the configuration of FIG. 14 (See arrow A2) because of the threaded engagement with the nut 16 which is, itself, kept immobile in translation as abutting against the bracket 20. The movement of screw 14 in its longitudinal direction continues until the screw head 140 abuts against the frame 6. Afterwards, inside socket 17 stops rotating and outside socket 18 starts rotating in the opposite direction R2, leading the nut 16 to rotate in the same direction. In other words, the outside sleeve 18 transmits a torque to the nut 16, which forces it to rotate, as depicted by arrow R2. This enables to clamp the brackets 20 between the nut 16 and the beam 6. In the order, the bracket 20 (more generally the component to be fastened) is clamped between the beam 6 and the nut 16.

Obviously, even if the robot 2 is represented on FIG. 1 in a test environment, in which is the beam 6 rests on fixed supports, the robot of the invention is designed for being integrated on the line of production of vehicles, e.g. trucks. In other words, this robot 2 is dedicated to be used in the manufacturing process of a vehicle.

It is to be understood that the present invention is not limited to the embodiments described above and illustrated in the drawings; rather, the skilled person will recognize that many changes and modifications may be made within the scope of the appended claims.

The invention claimed is:

1. A robot for tightening bolt nuts on a vehicle chassis, comprising:
    a polyarticulated arm at the end of which is a nut tightening tool, the nut tightening tool comprising a socket having an orifice having a shape complementary to a nut;
    a sleeve-shaped centering member arranged around the socket; and
    a clamping screw for clamping the sleeve-shaped centering member around the socket, the clamping screw passing through two tabs facing each other and separated from one another by an axial slot;
    wherein the sleeve-shaped centering member comprises a frustoconical surface which makes it possible, on contact with the nut, to reposition the nut tightening tool automatically to reposition the socket in the axis of the nut.

2. The robot of claim 1, wherein the nut tightening tool is of an electric type.

3. The robot of claim 1, wherein the nut tightening tool is of a low reaction torque type.

4. The robot of claim 1, wherein the robot is capable of following a path with an accuracy of +/−0.2 mm with respect to a control path.

5. The robot of claim 1, wherein the frustoconical surface is a chamfer extending between one end surface of the centering member perpendicular to a central axis of the centering member and an inner radial surface parallel to the central axis of the centering member.

6. The robot of claim 1, wherein the robot is devoid of a camera.

7. The robot of claim 1, wherein the centering member projects axially beyond the nut tightening tool.

* * * * *